United States Patent
Xiao (10) Patent No.: US 10,751,697 B2
(45) Date of Patent: Aug. 25, 2020

(54) METHOD OF PRODUCING HIGHLY POROUS ADSORBENTS

(71) Applicant: University of North Dakota, Grand Forks, ND (US)

(72) Inventor: Feng Xiao, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 102 days.

(21) Appl. No.: 16/213,742

(22) Filed: Dec. 7, 2018

(65) Prior Publication Data

US 2019/0247829 A1 Aug. 15, 2019

Related U.S. Application Data

(60) Provisional application No. 62/608,309, filed on Dec. 20, 2017.

(51) Int. Cl.

| | |
|---|---|
| *C01B 31/10* | (2006.01) |
| *B01J 20/30* | (2006.01) |
| *B01J 20/20* | (2006.01) |
| *B01J 20/28* | (2006.01) |
| *C01B 32/324* | (2017.01) |
| *C01B 32/336* | (2017.01) |

(52) U.S. Cl.
CPC ........... *B01J 20/3078* (2013.01); *B01J 20/20* (2013.01); *B01J 20/28004* (2013.01); *B01J 20/2808* (2013.01); *B01J 20/28064* (2013.01); *B01J 20/28083* (2013.01); *B01J 20/3028* (2013.01); *B01J 20/3085* (2013.01); *C01B 32/324* (2017.08); *C01B 32/336* (2017.08); *C01P 2002/82* (2013.01); *C01P 2004/03* (2013.01); *C01P 2004/52* (2013.01); *C01P 2006/12* (2013.01)

(58) Field of Classification Search
CPC .................................................... C01B 32/336
See application file for complete search history.

(56) References Cited

U.S. PATENT DOCUMENTS

| | | | |
|---|---|---|---|
| 5,102,855 A | 4/1992 | Greinke et al. | |
| 5,162,286 A | 11/1992 | MacDowall | |
| 5,250,491 A | 10/1993 | Yan | |
| 6,057,262 A | 5/2000 | Derbyshire et al. | |
| 7,662,747 B2 * | 2/2010 | De Ruiter | B01J 20/20 |
| | | | 423/447.2 |
| 8,691,177 B2 | 4/2014 | Pfeifer et al. | |
| 8,759,253 B2 | 6/2014 | De Leede et al. | |
| 2013/0190542 A1 | 7/2013 | Romanos et al. | |

OTHER PUBLICATIONS

Y. Sudaryanto et al., "High surface area activated carbon prepared from cassava peel by chemical activation", from Bioresource Technology 97 (2006) pp. 734-739.

N. H. Phan et al., "Production of fibrous activated carbons from natural cellulose (jute, coconut) fibers for water treatment applications", from Carbon 44 (2006) pp. 2569-2577.

O. S. Amuda et al., "Removal of heavy metal from industrial wastewater using modified activated coconut shell carbon", from Biochemical Engineering Journal 36 (2007) pp. 174-181.

I.A.W. Tan et al., "Optimization of preparation conditions for activated carbons from coconut husk using response surface methodology", from Chemical Engineering Journal 137 (2008) pp. 462-470.

K. Yang et al., "Preparation of high surface area activated carbon from coconut shells using microwave heating", from Bioresource Technology 101 (2010) pp. 6163-6169.

A. A. Ceyhan et al., "A novel thermal process for activated carbon production from the vetch biomass with air at low temperature by two-stage procedure", from Journal of Analytical and Applied Pyrolysis 104 (2013) pp. 170-175.

R. H. Hesas et al., "Comparison of oil palm shell-based activated carbons produced by microwave and conventional heating methods using zinc chloride activation", from Journal of Analytical and Applied Pyrolysis 104 (2013) pp. 176-184.

A. S. Ello et al., "Coconut shell-based microporous carbons for CO2 capture", from Microporous and Mesoporous Materials 180 (2013) pp. 280-283.

J. Zheng et al., "Preparation and characterization of activated carbon fiber (ACF) from cotton woven waste", from Applied Surface Science 299 (2014) pp. 86-91.

A. R. Hidayu et al., "Preparation and characterization of impregnated activated carbon from palm kernel shell and coconut shell for CO2 capture", from Procedia Engineering 148 (2016) pp. 106-113.

P. S. Thue et al., "Preparation, characterization and application of microwave-assisted activated carbons from wood chips for removal of phenol from aqueous solution", from Journal of Molecular Liquids 223 (2016) pp. 1067-1080.

X. Dai et al., "High Yield Activated Carbon from Biomass by Air Activation", from Hawaii Natural Energy Inst. and the Dept. of Mechanical Engineering, Univ. of Hawaii, pp. 864-866.

F. Xiao et al., "Preparation of Activated Carbon from Coconut Shell Using Thermal Air Oxidation", Poster Presentation Jun. 22, 2017, Univ. of North Dakota Pilot Postdoctoral Program from the Office of Vice President for Research, 1 page.

\* cited by examiner

*Primary Examiner* — Stuart L Hendrickson
(74) *Attorney, Agent, or Firm* — Kinney & Lange, P.A.

(57) ABSTRACT

A process for producing activated carbon includes carbonizing an organic material to produce a charcoal, heating the charcoal in a chamber in the presence of oxygen at a temperature in the range of 400 to 500° C. for a duration of time sufficient to produce the activated carbon, and removing the charcoal from the heat once the activated carbon is formed.

20 Claims, 7 Drawing Sheets

FIG. 1A  FIG. 1B

FIG. 2A  Char 400  FIG. 2B
Char 500

FIG. 2C  FIG. 2D
Char 400 treated at 500 °C for 30 min.

FIG. 2E  FIG. 2F
Char 500 treated at 500 °C for 30 min.

FIG. 2G  FIG. 2H
Char 500 treated at 500 °C for 60 min.

METHOD OF PRODUCING HIGHLY POROUS ADSORBENTS

CROSS-REFERENCE TO RELATED APPLICATION(S)

This application claims the benefit of U.S. Provisional Application No. 62/608,309 filed Dec. 20, 2017 for "Method of Producing Highly Porous Adsorbents" by F. Xiao.

BACKGROUND

The present invention relates generally to activated carbon and a method of forming the same and, more particularly, to a method of producing highly porous adsorbents using thermal oxygen activation.

Activated carbon is commonly used to remove pollutants, contaminants, and other impurities from gaseous and liquid media, including air and water. It is used in a wide variety of applications throughout a broad range of industries. Activated carbon is a highly porous and adsorptive material comprised primarily of carbon atoms. A network of connected micro- and mesopores trap contaminants, pollutants, and other impurities that enter the material by the process of adsorption, in which atoms, ions, and molecules adsorb or attach to the surface of the carbonaceous material. The effectiveness of activated carbon is generally improved with increased micro- and/or mesopore surface area and by finely tuning pore size to match the size of contaminants of concern. Pores significantly larger than the contaminants of concern are generally ineffective in trapping the contaminants.

Activated carbons have been manufactured from a wide variety of biomass materials, including coconut shells, wood, peat, among many other materials, as well as fossilized plant material (e.g., lignite and bituminous coal). Existing technologies for producing activated carbons include physical activation and chemical activation. Physical activation methods use carbon dioxide or steam as the activating gas at a relatively high temperature (e.g., >700° C.) in specially designed reactors. Chemical activation is typically conducted in the presence of nitrogen at a lower temperature and requires the addition of reactive chemical agents, such as zinc chloride or phosphoric acid.

Little research is available on thermal oxygen activation and that which has been conducted has included the addition of other gases (e.g., nitrogen or helium) to the air to serve as thermal ballast. Experiments conducted by Dai et al. with pure air showed some burning, evidenced by ash formation. Dai et al. (Dai et al., "High Yield Activated Carbon from Biomass by Air Activation," 864) concluded the necessity to control temperature and oxygen partial pressure was one of the reasons activated carbon was difficult to produce by air/oxygen activation.

SUMMARY

In one aspect, a process for producing activated carbon includes carbonizing an organic material to produce a charcoal, heating the charcoal in a chamber in the presence of oxygen at a temperature in the range of 400 to 500° C. for a duration of time sufficient to produce the activated carbon, and removing the charcoal from the heat once the activated carbon is formed.

In another aspect, a process for producing activated carbon includes carbonizing an organic material at a temperature in the range of 400 to 500° C. to produce a charcoal, providing the charcoal to a furnace, supplying oxygen to the furnace, and heating the charcoal at a temperature within the range of 400 to 500° C. for 30 to 60 minutes.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present invention provides a cost-effective approach for producing commercial-grade highly porous carbonaceous adsorbents (i.e., activated carbon), using thermal oxygen activation. Thermal oxygen activation is a physical activation process comparable to commercial physical activation processes, but in which oxygen replaces conventional carbon dioxide and steam as the activating gas. The source of oxygen can be air, pure oxygen, or a mixture of oxygen with one or more gases. The process of activation can be performed at a moderate temperature (e.g., 400 to 500° C.) in a conventional oven or furnace or commercial reactor with or without a regulated supply of air/oxygen. The activation process can be completed in an expedited time frame, generally within 30 to 60 minutes. The disclosed thermal oxygen activation process provides a significant and unexpected improvement over commercial physical activation processes, which require inputs of carbon dioxide or steam, specialized reactors, high activation temperatures (>700° C.), and multiple hours of processing. It also provides advantage over commercial chemical activation processes, which require the addition of reactive chemical agents and additional washing and processing steps depending on the desired purity or end product. While the present invention can replace current commercial activation processes, it can also be used in small-scale applications, including residential use. One particular benefit of the present invention is the ability to activate a charcoal that is produced according to the present invention in a conventional oven or furnace used in residential homes to produce activated carbon, which can be used to purify drinking water. Such ability may be of particular need following a natural disaster or other condition in which drinking water has been contaminated.

In the present invention, a carbonized organic feedstock (charcoal) can be made more porous or "activated" by heating with air. The carbonized organic feedstock can be a char (i.e., charcoal) or other organic feedstock that has undergone a carbonization process, generally requiring heating in the presence of an inert gas. In the disclosed process, organic feedstocks have been converted to charcoal under a controlled atmosphere of nitrogen at a temperature within the range of 300 to 800° C. Carbonization causes a reduction in the weight of the organic feedstock as water and volatile materials are consumed and replaced by open porosity. While the process of carbonization can increase the porosity of the organic material, the pore size is generally too small and connectivity is too restricted to serve as an effective adsorbent. The porosity, therefore, must be optimized with a subsequent activation process. The present disclosure identifies an optimal carbonization temperature range of 400 to 500° C. for providing the highest available surface area when combined with thermal oxygen activation.

Organic feedstocks can include, but are not limited to, lignocellulosic materials (e.g., coconut shells, wood, walnut shells, almond shells, peanut shells, corn cobs, etc.) and fossilized plant material (e.g., lignite and bituminous coal) as known in the art. Coconut shells, in particular, have been widely used to produce commercially available activated carbon. For comparison with commercialized processes, the experimental results disclosed herein are for thermal oxygen activation of coconut shells. However, other material feedstocks, including walnut shells, almond shells, peanut shells, and lignite were tested and shown to produce similar results, although the optimal activation temperature for the different feedstocks varied within the range of 400 to 500° C.

The resulting charcoal can be placed in a conventional oven or furnace or a commercial reactor in the presence of oxygen for thermal oxygen activation. The oxygen supply may or may not be regulated depending on the device used. Catalysts can be used during thermal oxygen activation to increase the surface area and/or yield of the activated carbon. In continuous flow commercial reactors, pressurized environmental air, oxygen, or a mixture of oxygen and one or more gases can be passed through the organic feedstock during activation. In conventional ovens or furnaces, the oxygen used for activation can be the air available in the chamber without any additional input. Any air supplied to the chamber or reactor for thermal oxygen activation can be ambient or outside air (contains approximately 21% oxygen, 78% nitrogen, and traces of water vapor, argon, carbon dioxide, and other gases) with no addition of other gases as commonly used in conventional chemical activation processes. In experiments disclosed herein, approximately 10-20 grams of granulated charcoal, having particle sizes of approximately 0.4 to 2 millimeters, was placed in a 4 to 6 L chamber (0.004 to 0.006 cubic meters) containing air. No significant variation was observed in the effectiveness of the thermal oxygen activation process based on the amount of charcoal present.

Thermal oxygen activation removes biomass oil or tar that blocks pores in the charcoal. The oxygen can oxidize the oils or tars that form during the carbonization process and convert the oils and tars to carbon dioxide and other volatiles, which can be released from the charcoal. In this manner, activation opens the pore structures thereby making more surface area available for adsorption—the process by which contaminants, pollutants, and other impurities adhere to the surface of the activated carbon. As previously discussed, activated carbon can be used to remove contaminants, pollutants, or other impurities from fluid streams (e.g., contaminated water or air). A combination of micropores, generally having a size less than two nanometers (20 angstroms), and mesopores, having a size from two to about 50 nanometers, are generally needed to effectively trap a majority contaminants of concern in water treatment. For effective adsorption, the size of the pores must be tailored to the size of the contaminant of concern. For instance, micropores are required to trap many common contaminants found in drinking water sources, including herbicides and hormones, because of the small size of these contaminants. Mesopores, although also important, can allow such small contaminants to pass through the material without adsorbing and, therefore, can be undesirable in large quantities. In general, adsorption can be improved by increasing the surface area and volume of micropores and/or mesopores. As disclosed in the present invention, the size of the pores and surface area can be controlled by modifying the thermal oxygen activation temperature and time, and can be dependent on the temperature at which the organic feedstock was carbonized.

Figure 1A:
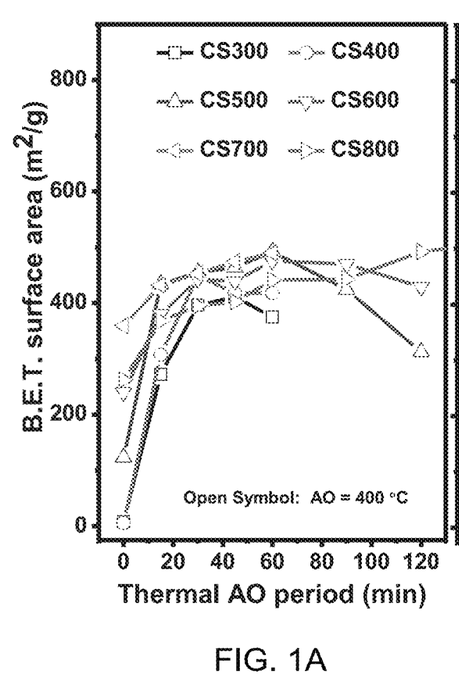
FIGS. 1A and 1B are plots of available surface area of charcoals before and after thermal oxygen activation using air as the oxygen source.
Figure 1B:
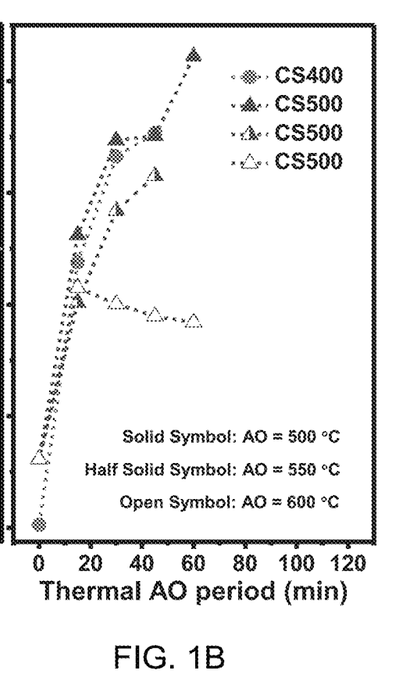

In an optimized thermal oxygen activation process, the charcoal can be heated in the presence of air at a temperature within the range of 400 to 500° C. for a period of 30 to 60 minutes. This optimized process was based on experiments disclosed in FIGS. 1A and 1B. FIGS. 1A and 1B show the surface area, as determined using Brunauer-Emmett-Teller (BET) surface area analysis, of various charcoals (CS300-CS800) treated with thermal oxygen activation at different temperatures (400, 500, 550, and 600° C.). Charcoals CS300-CS800 represent organic feedstock that were carbonized at 300 to 800° C. FIG. 1A shows that the BET surface area increased by 300 $m^2/g$ for charcoal CS400 (carbonization temperature of 400° C.) with 20 minutes of thermal oxygen activation at a temperature of 400° C., and continued to increase at least another 100 $m^2/g$ with an additional ten minutes of thermal oxygen activation. Similar results were observed with charcoal CS500 (carbonization temperature of 500° C.). In contrast, the surface area for charcoal CS700 (carbonization temperature of 700° C.) only increased around 100 $m^2/g$ with 20 minutes of thermal oxygen activation and remained relatively unchanged with additional activation time. FIG. 1B shows the thermal oxygen activation of charcoals CS400 and CS500 at varying activation temperatures. Surface areas of approximately 700 $m^2/g$ or greater were observed for both charcoals CS400 and CS500 at an activation temperature of 500° C. for 30 to 60 minutes. Thermal oxygen activation at temperatures in excess of 500° C. resulted in burning. Temperatures in excess of 600° C. resulted in the production of some ash.

Figure 2A:
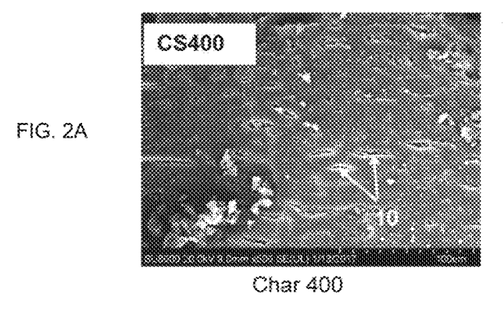
FIGS. 2A-2H are SEM images of charcoals before and after thermal oxygen activation using air as the oxygen source.
Figure 2B:
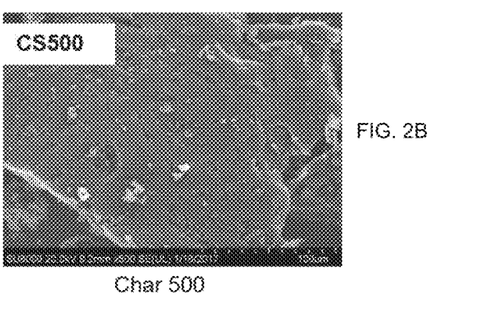
Figure 2C:
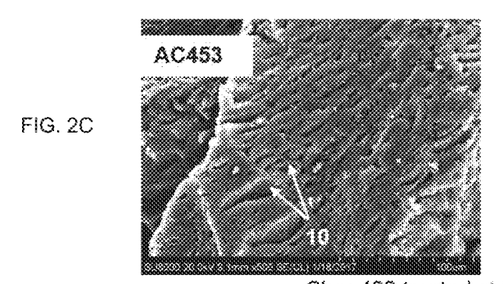
Figure 2D:
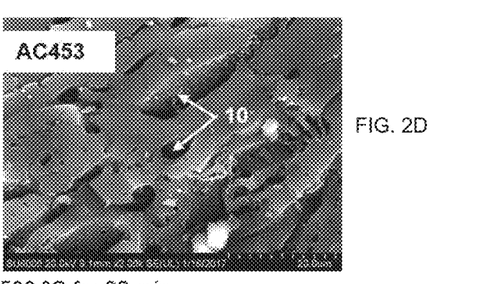
Figure 2E:
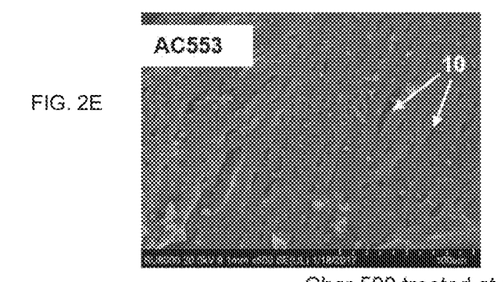
Figure 2F:
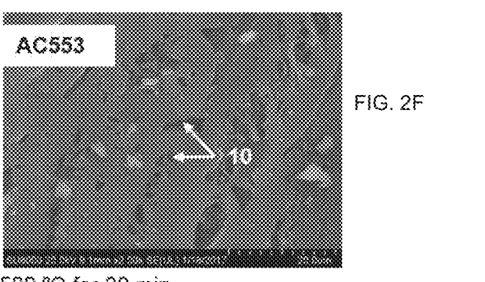
Figure 2G:
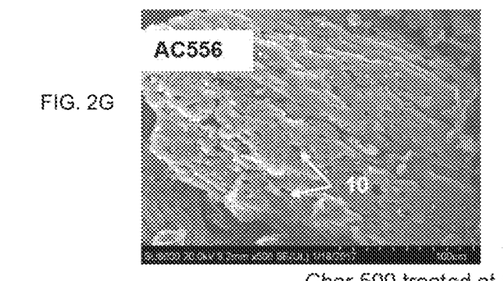
Figure 2H:
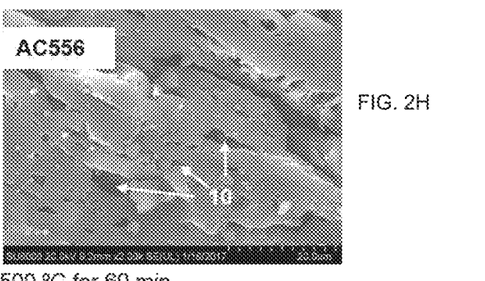
Figure 3A:
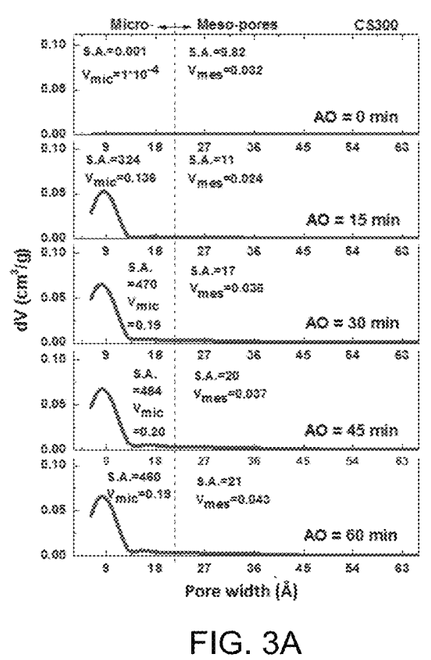
FIGS. 3A-3F are plots of pore size distribution and volume for charcoals before and after thermal oxygen activation at 400° C. using air as the oxygen source.
Figure 3B:
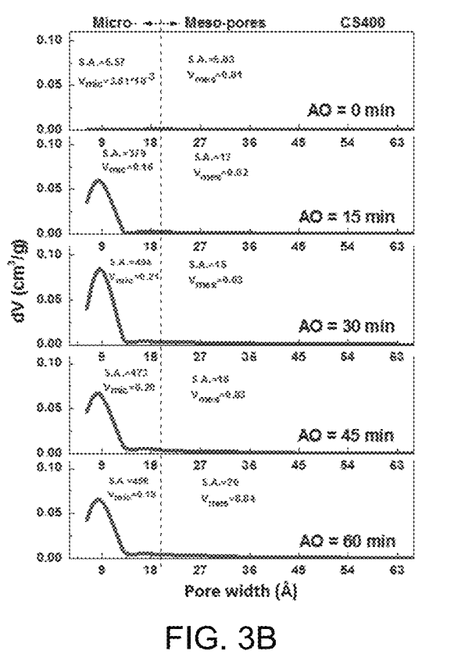
Figure 3C:
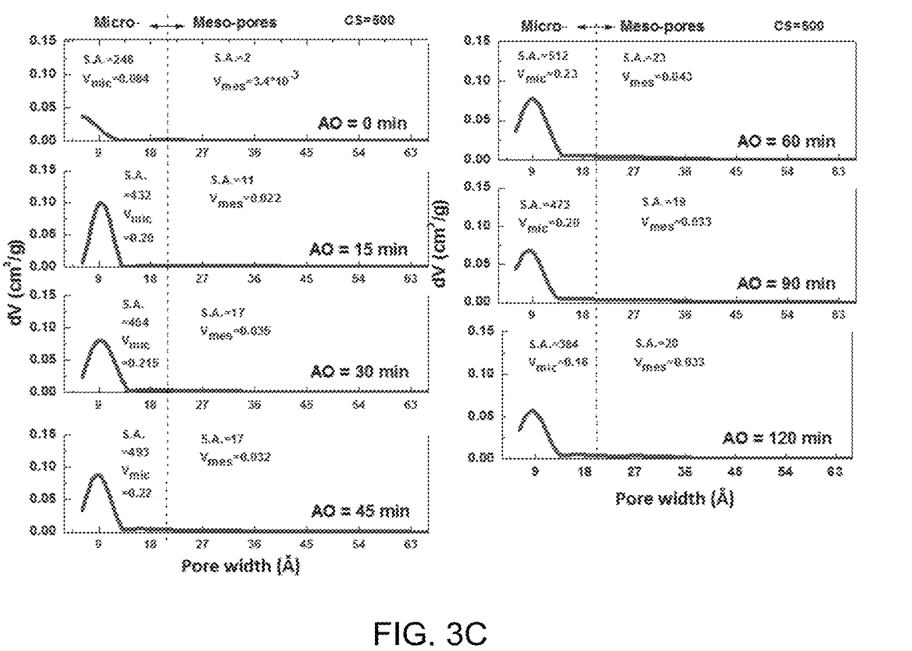
Figure 3D:
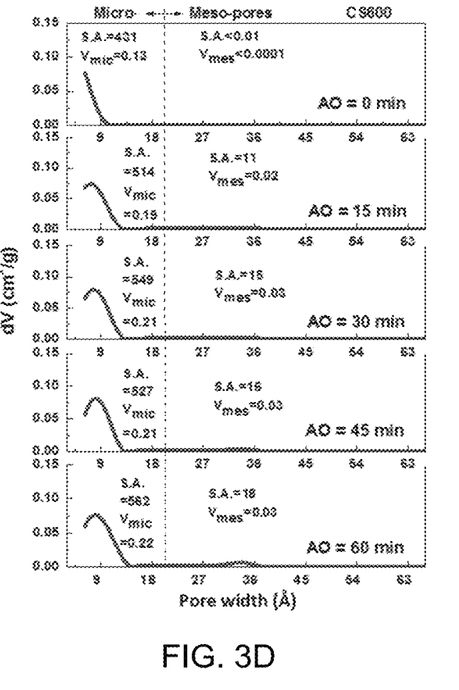
Figure 3E:
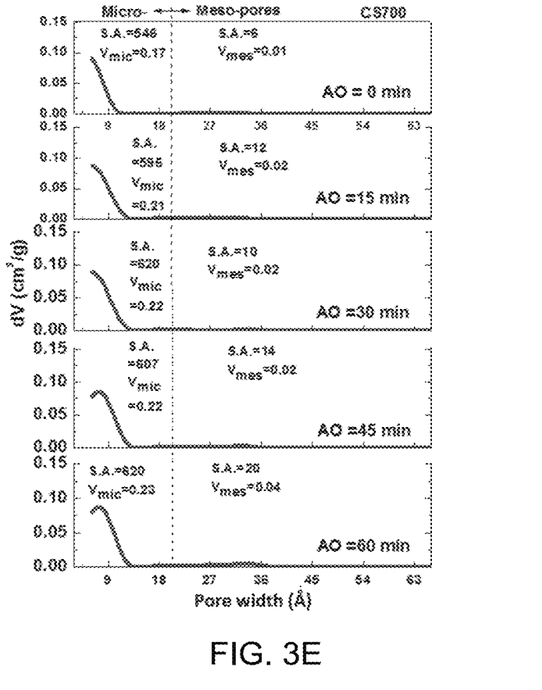
Figure 3F:
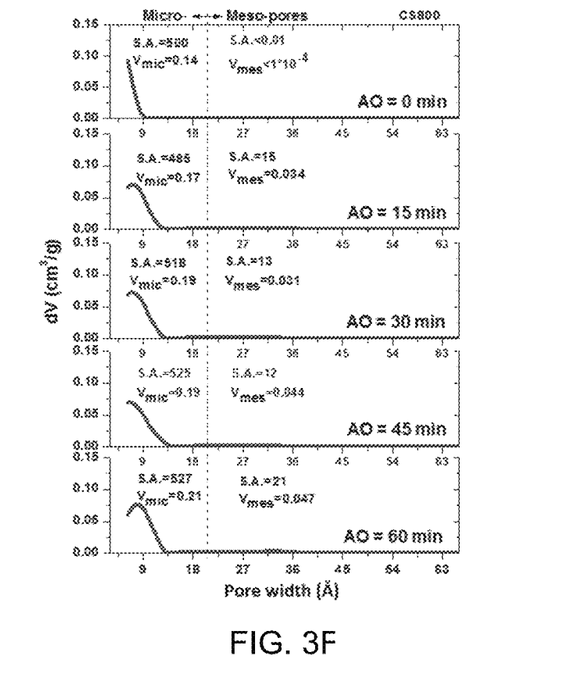

FIGS. 2A-2H show scanning electron microscope (SEM) images of original charcoals CS400 and CS500 and thermally air activated carbon (AC) products. FIGS. 2A and 2B show original charcoals CS400 and CS500, respectively. FIGS. 2C and 2D show activated carbon AC453, which is original charcoal CS400 (carbonization temperature of 400° C.) activated at a temperature of 500° C. for 30 minutes. The image shown in FIG. 2D is of a higher resolution than FIG. 2C. FIGS. 2E and 2F show activated carbon AC553 (carbonization temperature of 500° C.) activated at a temperature of 500° C. for 30 minutes. The image shown in FIG. 2F is of a higher resolution than FIG. 2E. FIGS. 2G and 2H show activation of the charcoal CS500 at 500° C. after 60 minutes. The image shown in FIG. 2H of a higher resolution than FIG. 2G. As can be observed in FIG. 2A, the surface of the charcoal is relatively smooth with some pores 10. The number and volume of pores 10 visibly increase with thermal oxygen activation as shown in FIGS. 2C-2H. As shown in FIGS. 2C-2H, the size of pores 10 can vary (only a few of the total number of visible pores 10 are labeled in FIGS. 2C-2H). The percent yield of activated carbon ranged from 60 to 75%, as determined by the change in weight of the charcoal following thermal oxygen activation.

Figure 4A:
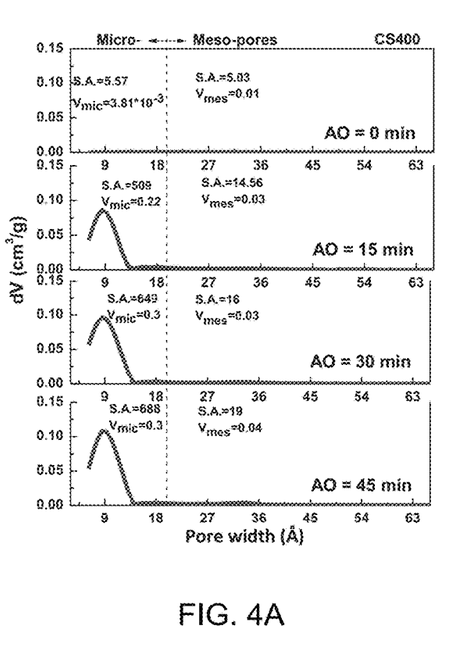
FIGS. 4A and 4B are plots of pore size distribution and volume for charcoals before and after thermal oxygen activation at 500° C. using air as the oxygen source.
Figure 4B:
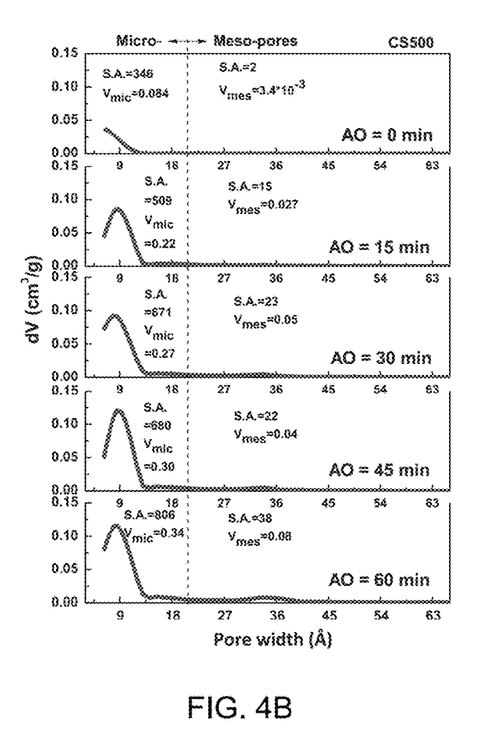

FIGS. 3A-3F show pore size distribution of original charcoals CS300-CS800 and charcoals CS300-CS800 after thermal oxygen activation at 400° C. collected at 15 minute intervals up to 60 minutes and then collected at 90 minutes and 120 minutes for charcoal CS500. FIGS. 4A and 4B show the pore size distribution of charcoals CS400 and CS500 before and after thermal oxygen activation at 500° C. at 15-minute intervals. FIGS. 3A-3F and FIGS. 4A and 4B disclose the pore width, as measured in angstroms, pore volume per gram of adsorbent (dV), BET surface area (S.A.), total volume of micropores ($V_{mic}$), and total volume of mesopores ($V_{mes}$), as determined following thermal oxygen activation for each time interval. The pore volumes ($V_{mic}$ and $V_{mes}$) are determined by quenched solid density functional theory from $N_2$ adsorption isotherm at 77 K. The total pore volume represents connected open porosity. As shown in FIGS. 3A-3F and FIGS. 4A and 4B, the volume of micropores, pore width, and surface area vary depending on the carbonization temperature at which the charcoal was produced. Thermal oxygen activation was shown to increase the volume and surface area of micropores, particularly for charcoals CS300-CS500. A high surface area and high total volume of micropores can be preferred for water treatment applications, as the micropores (smaller than two nanometers (20 angstroms)) are necessary for trapping many contaminants of concern (e.g., particular herbicides and hormones commonly present and which pose a health risk).

Figure 5A:
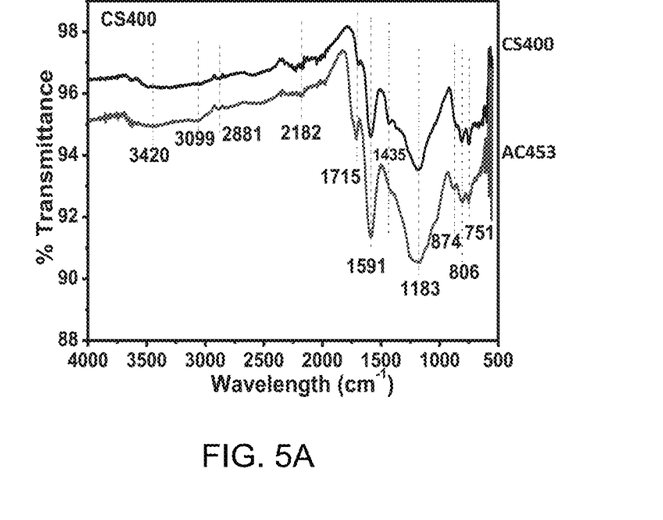
FIGS. 5A and 5B are FTIR spectrum plots of charcoals before and after thermal oxygen activation using air as the oxygen source.
Figure 5B:
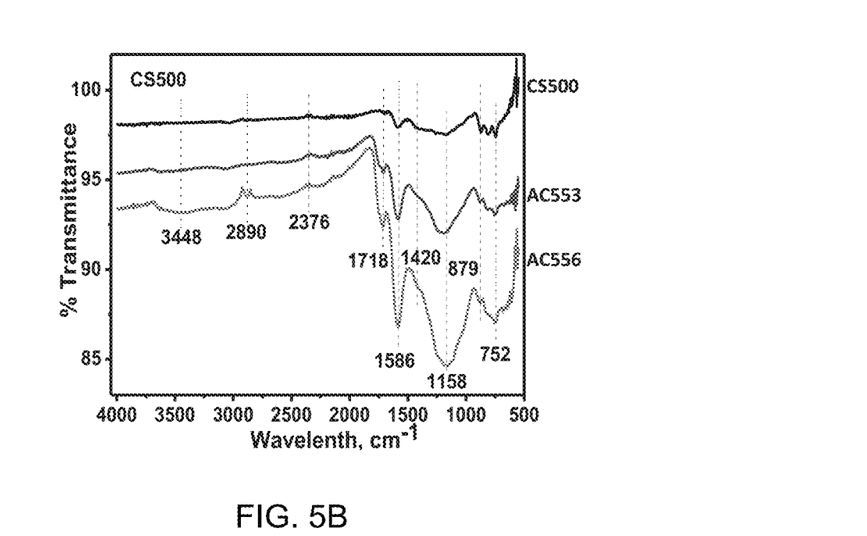

FIGS. 5A and 5B show FTIR spectrums of original charcoals CS400 and CS500 before and after thermal oxygen activation at 400 and 500° C., respectively. FIG. 5A shows original charcoal CS400 and activated carbon AC453, which has undergone thermal oxygen activation at 400° C. for 30 minutes. FIG. 5B shows original charcoal CS500 and two activated carbon products from CS500 (AC553 and AC556) that have undergone thermal oxygen activation at 500° C. for 30 minutes and 60 minutes, respectively. FIGS. 5A and 5B demonstrate that in addition to increasing the surface area and micropore volume available for adsorption, thermal oxygen activation also increases the functional groups available for fixing contaminants.

Figure 6A:
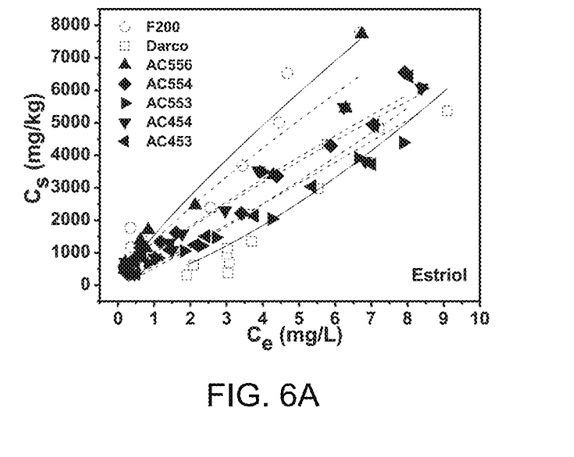
FIGS. 6A-6C are plots of contaminant adsorption for activated carbon of the present invention and commercially available products.
Figure 6B:
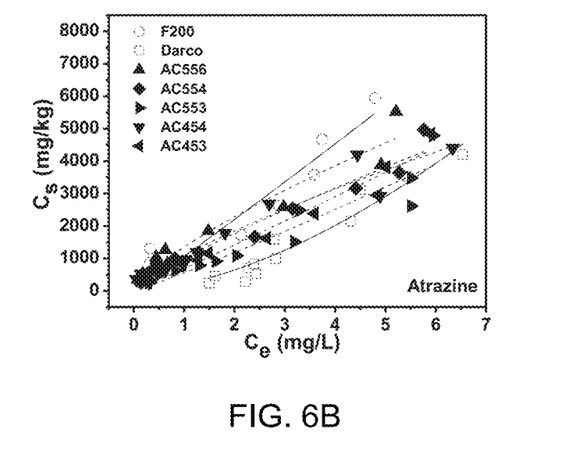
Figure 6C:
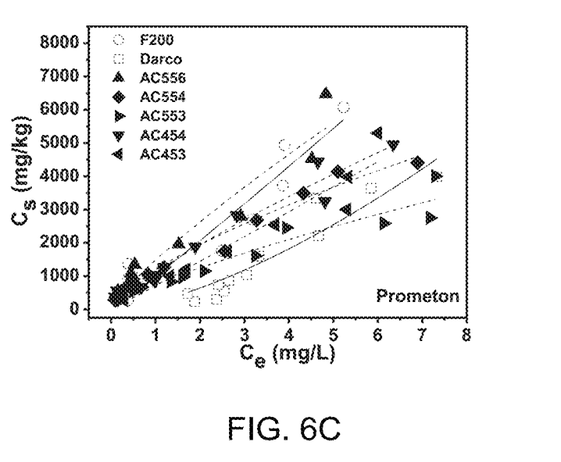

FIGS. 6A-6C compare adsorption of three organic compounds on various thermally oxygen activated carbon disclosed in the present invention to adsorption on two widely used commercial activated carbon samples (F200 and Darco). Activated carbon samples AC556, AC554, and AC553 are made from original charcoal CS500 (carbonization temperature of 500° C.) that has undergone thermal oxygen activation at 500° C. for 60 minutes, 45 minutes, and 30 minutes, respectively. Activated carbon samples AC454 and AC453 are produced from original charcoal CS400 (carbonization temperature of 400° C.) that has undergone thermal oxygen activation at 500° C. for 45 minutes and 30 minutes, respectively. FIGS. 6A-6C show the concentration of the contaminant ($C_e$) versus the amount of contaminant adsorbed per kilogram sorbent ($C_s$). As shown in FIGS. 6A-6C, thermally oxygen activated carbon can perform as well as and can also outperform commercially available activated carbon. The contaminants tested included the hormone, estriol, and two herbicides, atrazine and prometon.

Thermal oxygen activation can provide a cost-effective means for producing high yield activated carbon from lignocellulosic materials that are as effective as, if not more effective than, commercially available activated carbon. Thermal oxygen activation does not require additional inputs for activation, nor does thermal oxygen activation require high temperatures or long activation times. Thermal oxygen activation using oxygen sources such as ambient air and heating temperatures between 400 and 500° C. for 30 to 60 minutes can produce a highly porous activated carbon. The activated carbon produced with thermal oxygen activation can replace commercially available activated carbon manufactured using energy-intensive processes or chemical inputs that reduce the purity of the material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The invention claimed is:

1. A process for producing activated carbon, the process comprising:
   carbonizing an organic material to produce a charcoal;
   heating the charcoal in a chamber in the presence of oxygen and a catalyst and at a temperature within the range 400 to 500° C. for a duration of time sufficient to produce the activated carbon; and
   removing the charcoal from the heat once the activated carbon is formed.

2. The process of claim 1, wherein heating the charcoal is performed in the presence of environmental air containing oxygen.

3. The process of claim 2, wherein environmental air is supplied to the chamber without the addition of other gases.

4. The process of claim 1, wherein the step of heating the charcoal is performed for 30 to 60 minutes.

5. The process of claim 4, wherein the organic material is carbonized under a controlled atmosphere of inert gas.

6. The process of claim 5, wherein the organic material is carbonized at a temperature in the range of 400 to 500° C.

7. The process of claim 6, wherein heating the charcoal produces a BET surface area greater than 500 m²/g.

8. The process of claim 7, wherein heating the charcoal produces a BET surface are of greater than 700 m²/g.

9. The process of claim 6, wherein heating the charcoal produces a percent yield of activated charcoal greater than 60 percent.

10. The process of claim 6, wherein heating the charcoal produces a plurality of micropores having pore size less than two nanometers.

11. The process of claim 10, wherein heating the charcoal produces a plurality of mesopores having pore size of between two and 50 nanometers.

12. The process of claim 6, wherein the charcoal is granulated, having an average particle size of 0.4 to 2 millimeters.

13. The process of claim 12, wherein the organic material is a lignocellulosic material.

14. A process for producing activated carbon comprising:
carbonizing an organic material at a temperature in the range of 400 to 500° C. to produce a charcoal;
providing the charcoal to a furnace;
supplying oxygen to the furnace;
heating the charcoal in the presence of oxygen and a catalyst and at a temperature within the range of 400 to 500° C. for 30 to 60 minutes; and
removing the charcoal from the heat once the activated carbon is formed.

15. The process of claim 14, wherein the step of carbonizing the organic material is conducted in a controlled atmosphere of inert gas.

16. The process of claim 14, wherein the organic material is a lignocellulosic material.

17. The process of claim 16, wherein the organic material is coconut shells.

18. The process of claim 14, wherein supplying oxygen to the furnace comprises supplying environmental air to the furnace.

19. The process of claim 18, wherein the environmental air is supplied to the chamber without the addition of other gases.

20. The process of claim 14, wherein supplying oxygen to the furnace comprises supplying a mixture of oxygen and other gases.

* * * * *